United States Patent

Watanabe et al.

[11] Patent Number: 5,792,526
[45] Date of Patent: Aug. 11, 1998

[54] MULTILAYER FILM AND CONTAINER

[75] Inventors: Katsushi Watanabe; Hideshi Okamoto, both of Tokushima; Hirohisa Taniguchi, Naruto, all of Japan

[73] Assignee: Otsuka Pharmaceutical Factory, Inc., Tokushima, Japan

[21] Appl. No.: 530,152

[22] PCT Filed: Feb. 17, 1994

[86] PCT No.: PCT/JP95/00245

§ 371 Date: Sep. 29, 1995

§ 102(e) Date: Sep. 29, 1995

[87] PCT Pub. No.: WO95/22456

PCT Pub. Date: Aug. 24, 1995

[51] Int. Cl.$^6$ .............................. B32B 27/32; B65D 1/00
[52] U.S. Cl. ..................... 428/35.7; 428/218; 428/340; 428/545
[58] Field of Search ..................... 428/35.7, 218, 428/340, 515

[56] References Cited

U.S. PATENT DOCUMENTS 4,196,240  4/1980  Lustig et al. ................... 428/35
4,952,451  8/1990  Mueller et al. ................. 428/218
5,478,617  12/1995 Watanabe et al. ............... 428/35.2
5,520,975  5/1996  Inoue et al. .................... 428/35.9

FOREIGN PATENT DOCUMENTS 0230114  7/1987  European Pat. Off. .
0286430  10/1988 European Pat. Off. .
0510213  10/1992 European Pat. Off. .

*Primary Examiner*—Charles Nold
*Attorney, Agent, or Firm*—Sughrue, Mion, Zinn, Macpeak & Seas, PLLC

[57] ABSTRACT

A multilayer film of the invention is a five-layer resin film comprising one or more ethylene-α-olefin copolymers in each resin layer, wherein the density of the resin comprising each layer is as follows, in order from the outer layer:

First layer: 0.935 to 0.950 g/cm$^3$
Second layer: 0.920 g/cm$^3$ or less
Third layer: 0.925 to 0.950 g/Cm$^3$
Fourth layer: 0.920 g/cm$^3$ or less
Fifth layer: 0.925 to 0.940 g/cm$^3$ The container of the invention is formed by using this multilayer film, and is excellent in heat resistance, blocking resistance, tensile strength, flexibility, and transparency. The multilayer film and container of the invention are suited for medical applications, and others.

8 Claims, 1 Drawing Sheet

MULTILAYER FILM AND CONTAINER

FIELD OF THE INVENTION

The present invention relates to a multilayer film and a container formed by using the same. specifically, it is used in the medical field, especially as a container for pharmaceutical solution, blood or the like.

BACKGROUND ART

As conventional examples of multilayer container for medical use, the following compositions made of polyethylene resin may be listed.

A. Japanese Patent Unexamined Publication No. 62-64363:

A three-layer bag composed of linear low density polyethylene, with the density of inner and outer layers being 0.920 g/cm$^3$ or more and the density of a middle layer being less than 0.920 g/cm$^3$.

B. Japanese Patent Unexamined Publication No. 63-248633:

A three-layer container composed of linear low density polyethylene, with the density of inner and outer layers being 0.910 to 0.940 g/cm$^3$ or more, the density of a middle layer being 0.880 to 0.905 g/cm$^3$, and a difference in the density between the two being 0.01 g/cm$^3$ or more.

C. Japanese Patent Unexamined Publication No. 3-277365:

A three-layer bag comprising an outer layer of linear low density polyethylene with the density of 0.920 g/cm$^3$ or more, a middle layer of linear low density polyethylene with the density of 0.915 g/cm$^3$ or less, and an inner layer of branched low density polyethylene with the density of 0.918 g/cm$^3$ or more.

D. Japanese Patent Unexamined Publication No. 4-266759:

A bag of three layers or more comprising inner and outer layers composed of a resin in which 5 to 40% of high density polyethylene with the density of 0.945 g/cm$^3$ or more is mixed with a low density polyethylene having long-chain branches with the density of 0.930 g/cm$^3$ or less, and a middle layer composed of a resin in which 15% or less of the same high density polyethylene is mixed with a linear low density polyethylene with the density of 0.920 g/cm$^3$ or less.

These compositions, however, have at least one of the following problems:

(1) Since the inner and outer layers are composed of polyethylene resin of low density, heat resistance is insufficient, and seal strength and drop-shock resistance are lowered by high pressure steam sterilization, hot water sterilization, or other sterilization in high temperature condition.

(2) Blocking is liable to occur after such sterilization in high temperature condition.

(3) Wall thickness must be increased in order to enhance the strength of the entire film.

(4) Since tensile strength is insufficient, the production of the bag cannot be speeded up.

(5) Since the temperature of a heater cannot be increased during heat sealing, it is impossible to seal in a short time.

(6) The transparency or flexibility is lowered after sterilization or the like.

It is therefore a primary object of the invention to produce a film and a container suited for medical use, while eliminating all the above problems.

SUMMARY OF THE INVENTION

To achieve the above object, a multilayer film of the invention is a five-layer resin film comprising one or more ethylene-α-olefin copolymers in each resin layer wherein the density of the resin comprising each layer is as follows, in order from the outer layer:

First layer: 0.935 to 0.950 g/cm$^3$
Second layer: 0.920 g/cm$^3$ or less
Third layer: 0.925 to 0.950 g/cm$^3$
Fourth layer: 0.920 g/cm$^3$ or less
Fifth layer: 0.925 to 0.940 g/cm$^3$ In the multilayer film of the invention, to the resin of the fifth layer, ethylene-α-olefin copolymer with a density of 0.945 g/cm$^3$ or more may be added in an amount up to 10% by weight.

Furthermore, in the multilayer film of the invention, the resin comprising the second layer and fourth layer is preferably:

(1) A mixed resin comprising 40 to 60% by weight of ethylene-α-olefin copolymer with density of 0.900 to 0.920 g/cm$^3$, 40 to 60% by weight of ethylene-α-olefin in elastomer with density of less than 0.900 g/cm$^3$, and less than 5% by weight of high density polyethylene with density of 0.955 g/cm$^3$ or more, (2) A mixed resin comprising 20 to 60% by weight of ethylene-α-olefin copolymer with density of 0.900 to 0.920 g/cm$^3$, 40 to 60% by weight of ethylene-α-olefin elastomer with density of less than 0.900 g/cm$^3$, and 30% by weight or less of ethylene-α-olefin copolymer with density of 0.935 to 0.945 g/cm$^3$, or (3) A mixed resin comprising 20 to 50% by weight of ethylene-α-olefin copolymer with density of 0.935 to 0.945 g/cm$^3$, and 50 to 80% by weight of ethylene-α-olefin elastomer with density of less than 0.900 g/cm$^3$.

As to thickness of each layer, it is preferable that the first layer is 5 to 15%, the second layer is 35 to 45%, the third layer is 3 to 10%, the fourth layer is 35 to 45% and the fifth layer is 5 to 15% of the entire film thickness, respectively.

Every resin composing the film of the invention is an ethylene-α-olefin copolymer, and examples of α-olefin include propylene, 1-butene, 1-pentene, 1-hexene, 4-methyl-1-pentene, 1-heptene, 1-octene, 1-nonene, 1-decene, 1-undecene, 1-dodecene, and others with 3 to 12 carbon atoms.

Furthermore, the container for medical use according to the invention is characterized in being formed by using the above multilayer film.

Multilayered films and containers according to the invention are improved in heat resistance as compared with conventional products, and are also excellent in blocking resistance, tensile strength, flexibility and transparency.

DETAILED DESCRIPTION OF THE INVENTION

Figure 1:
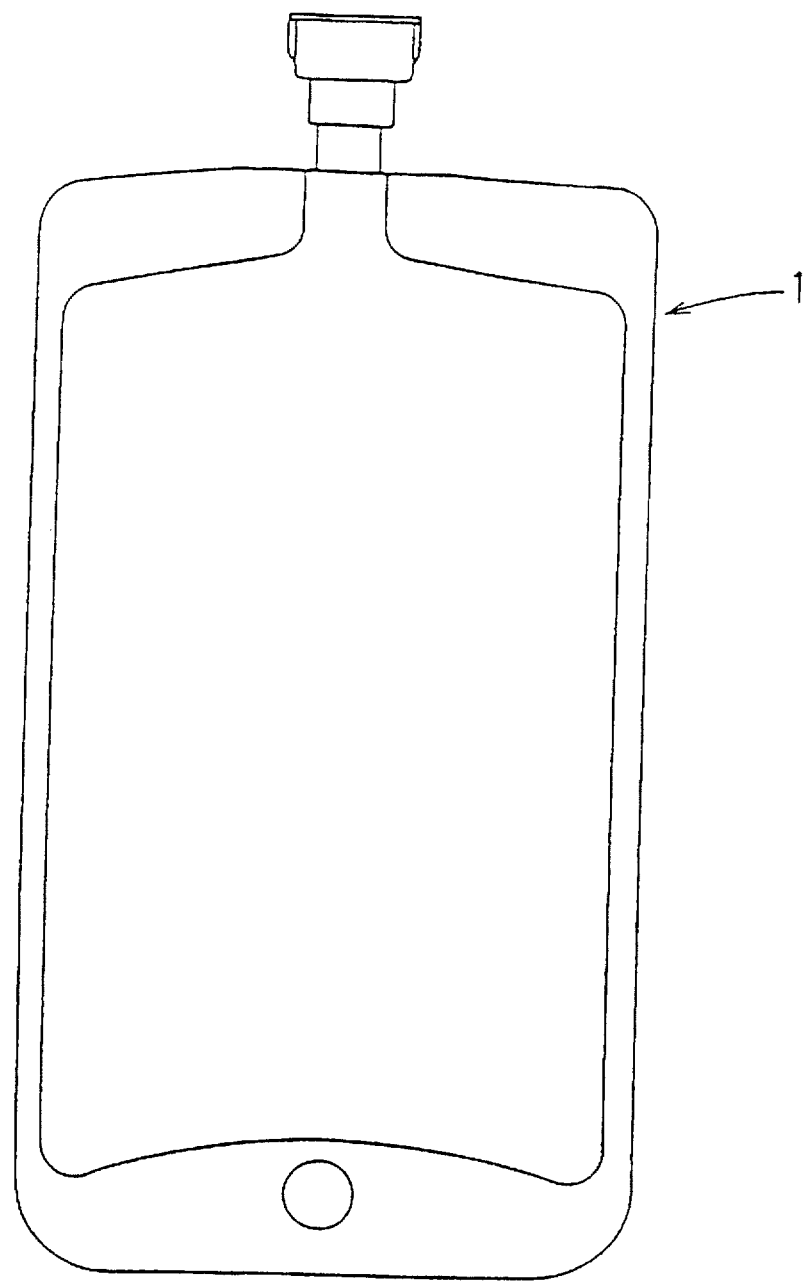
FIG. 1 is a front view of a preferable container according to the invention.

The following are detailed descriptions of resins used in each layer of the film and the container of the invention, and a method of manufacturing the same.

The First layer:

Since mechanical strength (especially tensile strength) and heat resistance are required, there should be used a resin having the density in a range of 0.935 to 0.950 g/cm$^3$, preferably 0.935 to 0.945 g/cm$^3$, specifically around 0.940 g/cm$^3$. In particular, a resin with the melt flow rate (MFR) of 1.5 to 2.5 g/10 min. (190° C.), and melting point of 120° to 130° C. is more suitable. The thickness should be 5 to 15% of the entire film.

The Second layer:

In order to make a container have a high flexibility, the ethylene-α-olefin copolymer used in this layer has a density of 0.920 g/cm³ or less, more preferably 0.890 to 0.905 g/cm³. Also, to retain transparency, it is preferable to use a linear copolymer. It is desirable that the MFR is 0.5 to 4.0 g/10 min. (190° C.) and the melting point is in a range of 105° to 120° C. For this layer, a resin mixture of two or more types can be used, which preferably is a mixture of 40 to 60% by weight of resin with density of 0.900 to 0.920 g/cm³ and 40 to 60% by weight of ethylene-α-olefin elastomer with density of less than 0.900 g/cm³. Furthermore, to this mixed resin, high density polyethylene with density of 0.955 g/cm³ or more may be added in an amount less than 5% by weight, or ethylene-α-olefin copolymer with density of 0.935 to 0.945 g/cm³ may be added up to 30% by weight, preferably up to 20% by weight, so that the heat resistance can be improved without lowering the flexibility. The high density polyethylene may be either α-olefin copolymer or homopolymer. Other examples of a resin mixture used in this layer include a mixture of 20 to 50% by weight of ethylene-α-olefin copolymer with density of 0.935 to 0.945 g/cm³ and a mixture of 50 to 80% by weight of ethylene-α-olefin elastomer with density of less than 0.900 g/cm³. When using a mixed resin, the density of the entire resin needs to be set within the above specified range. The thickness of the layer should be 35 to 45% of the entire film.

The Third layer:

To keep the strength (tenacity) of the entire film, a resin having a density in a range of 0.925 to 0.950 g/cm³, preferably 0.925 to 0.940 g/cm³, is used in the middle layer. The resin may be in either linear or branched, but a linear polymer is preferable in order to improve an affinity for other layers and to keep transparency. It is preferable that the MFR is in a range of 1.5 to 2.5 g/min. (190° C.) and the melting point is in a range of 120° to 130° C.

As a resin used in this layer, a mixed resin comprising two types of ethylene-α-olefin copolymer may be used, but in such a case, a resin having a density of 0.935 to 0.945 g/cm³ should be present at least in an amount of 40 to 60% by weight, and then, the other ethylene-α-olefin copolymer will be selected so that the density after blending should fall within the above specified range.

The thickness of this layer is approximately 3 to 10% of the entire film.

The Fourth layer:

The same resin as used in the second layer is disposed, thus maintaining flexibility of a container. The layer thickness may be the same as defined for the second layer.

The Fifth layer:

A resin having blocking resistance and heat resistance is disposed, thus making it possible to withstand sterilization at high temperature, to prevent blocking and to carry out heat sealing easily.

Specifically, a resin having a density of 0.925 to 0.940 g/cm³ should be used. The same resin as used in the third layer can be used, but in order to increase heat resistance, a resin with a density of 0.945 g/cm³ or more can be added up to about 10% by weight. In such a case, the density of the entire resin layer has to be within the above specified range. The thickness should be 5 to 15% of the entire film.

As methods for manufacturing a film of the invention, there are: a water-cooled or air-cooled extrusion inflation method, a co-extrusion T-die method, a dry lamination method, an extrusion lamination method, and others. In particular, the water-cooled co-extrusion inflation method and co-extrusion T-die method are preferable from the viewpoint of performance, in particular, transparency, economy and sanitation. In either method, it is necessary to proceed at a temperature necessary for melting the resin of each layer, but if the temperature is raised too high, part of the resin is thermally decomposed, and the performance may be lowered due to decomposition products. Therefore, the temperature condition in manufacturing the film of the invention is normally 150° to 250° C., preferably 170° to 200° C. In order to maintain transparency, the resin comprising each layer may have a minimum difference in MFR.

The thickness of the film of the invention manufactured in this method is generally 100 to 300μ, which may be increased or decreased depending on the intended use. A sufficient strength can be retained even at a thickness of about 200μ.

According to the method of manufacturing a container in the invention, a film in the form of tube or sheet obtained in the above described manner, is cut and heat-sealed by the conventional method, and a mouth part or the like is attached by heat seal or other means, thus manufacturing a container having a specified shape and dimensions. As to the heat sealing conditions for the film, the temperature may be raised to about 120° to 160° C., and for a film with thickness of, for example, about 200μ, it is possible to seal in a short time of 0.5 to 3 seconds in the above temperature range. Linear low density polyethylene is suitable for the mouth part because it fuses well with the inner layer of the film of the invention.

EXAMPLE

An evaluation experiment with a container formed by using the multilayer film of the invention will be described below.

First, laminate sheets of synthetic resin having the layer constitution shown in Table 1, were formed by water-cooled co-extrusion inflation method. Using these products, a container 1 for medical use having a capacity of 500 ml as shown in FIG. 1 was formed. Heat sealing the film when forming the container was done for 2 seconds at 140° C.

Then, in the obtained container 1 for medical use, the characteristics were evaluated according to the following method. That is, heat resistance was measured by visually observing the state of the container with respect to deformation, breakage and seal leakage after filling with internal solution and sterilizing in high pressure steam for 40 minutes at 110° C.

Drop-shock test was conducted by cooling at about 4° C., dropping each container five times from three directions from a height of 1.2 m, thus visually observing for breakage and seal leakage.

Flexibility was evaluated by visually observing the natural discharge property of the internal solution.

Transparency was evaluated by visually observing the container after filling with distilled water, sterilizing in high pressure steam, and by measuring transmission rate of 450 nm light.

In addition, by visually observing the entire appearance of the container, crease, blocking, deformation, and breakage were investigated.

On the other hand, as comparative examples, laminate sheets of synthetic resin and having the layer constitution shown in Table 2 were formed in the same manner as described above, and using these products, containers for medical use were formed by the same procedure. Then, each of the characteristics was evaluated.

In Tables 1 and 2, the following abbreviations are used.

PE-1=linear medium density polyethylene (ethylene-1-butene copolymer) [made by MITSUI PETROCHEMICAL INDUSTRIES, LTD.; density=0.940 g/cm$^3$, MFR=2.1 g/10 min (190° C.)]

PE-2=linear low density polyethylene (ethylene-1-butene copolymer) [made by MITSUI PETROCHEMICAL INDUSTRIES, LTD.; density=0.900 g/cm$^3$, MFR=0.9 g/10 min (190° C.)]

PE-3=linear medium density polyethylene (ethylene-1-butene copolymer) [made by MITSUI PETROCHEMICAL INDUSTRIES, LTD.; density=0.930 g/cm$^3$, MFR=2.1 g/10 min. (190° C.)]

PE-4=PE-3 blended with 5% by weight of high density polyethylene (ethylene-1-butene copolymer) [made by MITSUI PETROCHEMICAL INDUSTRIES, LTD.; density= 0.956 g/cm$^3$, MFR=0.9 g/10 min. (190° C.)] <density of the mixed resin=0.931 g/cm$^3$>

PE-5=a mixed resin <density of the mixed resin =0.905 g/cm$^3$> comprising:
- 45.5% by weight of linear low density polyethylene (ethylene-1-butene copolymer) [made by MITSUI PETROCHEMICAL INDUSTRIES, LTD.; density= 0.920 g/cm$^3$, MFR=2.1 g/10 min. (190° C.)],
- 50% by weight of ethylene-1-butene elastomer [made by MITSUI PETROCHEMICAL INDUSTRIES, LTD.; density=0.885 g/cm$^3$, MFR=0.5 g/10 min. (190° C.)], and
- 4.5% by weight of high density polyethylene (homopolymer) [made by MITSUI PETROCHEMICAL INDUSTRIES, LTD.; density=0.965 g/cm$^3$, MFR=15 g/10 min. (190° C.)]

PE-6=a mixed resin <density of the mixed resin =0.904 g/cm$^3$> comprising:
- 47.5% by weight of linear low density polyethylene (ethylene-1-butene copolymer) [made by MITSUI PETROCHEMICAL INDUSTRIES, LTD.; density= 0.920 g/cm$^3$, MFR=2.1 g/10 min. (190° C.)],
- 50% by weight of ethylene-1-butene elastomer [made by MITSUI PETROCHEMICAL INDUSTRIES, LTD.; density=0.885 g/cm$^3$, MFR=0.5 g/10 min. (190° C.)], and
- 2.5% by weight of high density polyethylene (homopolymer) [made by MITSUI PETROCHEMICAL INDUSTRIES, LTD.; density=0.965 g/cm$^3$, MFR=15 g/10 min. (190° C.)]

PE-7=a mixed resin <density of the mixed resin =0.898 g/cm$^3$> comprising:
- 45.5% by weight of linear low density polyethylene (ethylene-1-butene copolymer) [made by MITSUI PETROCHEMICAL INDUSTRIES, LTD.; density= 0.905 g/cm$^3$, MFR=2.9 g/10 min. (190° C.)],
- 50% by weight of ethylene-1-butene elastomer [made by MITSUI PETROCHEMICAL INDUSTRIES, LTD.; density=0.885 g/cm$^3$, MFR=0.5 g/10 min. (190° C.)], and
- 4.5% by weight of high density polyethylene (homopolymer) [made by MITSUI PETROCHEMICAL INDUSTRIES, LTD.; density=0.965 g/cm$^3$, MFR=15 g/10 min. (190° C.)]

PE-8=a mixed resin <density of the mixed resin =0.905 g/cm$^3$> comprising:
- 40% by weight of linear low density polyethylene (ethylene-1-butene copolymer) [made by MITSUI PETROCHEMICAL INDUSTRIES, LTD.; density= 0.920 g/cm$^3$, MFR=2.9 g/10 min. (190° C.)],
- 50% by weight of ethylene-1-butene elastomer [made by MITSUI PETROCHEMICAL INDUSTRIES, LTD.; density=0.885 g/cm$^3$, MFR=0.5 g/10 min. (190° C.)], and 10% by weight of PE-1

PE-9=a mixed resin <density of the mixed resin =0.904 g/cm$^3$> comprising:
- 45% by weight of linear low density polyethylene (ethylene-1-butene copolymer) [made by MITSUI PETROCHEMICAL INDUSTRIES, LTD.; density= 0.920 g/cm$^3$, MFR=2.9 g/10 min. (190° C.)],
- 50% by weight of ethylene-1-butene elastomer [made by MITSUI PETROCHEMICAL INDUSTRIES, LTD.; density=0.885 g/cm$^3$, MFR=0.5 g/10 min. (190° C.)], and 5% by weight of PE-1

PE-10=1:1 mixed resin <density of the mixed resin=0.930 g/cm$^3$> comprising: linear low density polyethylene (ethylene-1-butene copolymer) [made by MITSUI PETROCHEMICAL INDUSTRIES, LTD.; density=0.920 g/cm$^3$, MFR=2.9 g/10 min. (190° C.)], and PE-1

PE-11=a linear low density polyethylene (ethylene-1-butene copolymer) [made by MITSUI PETROCHEMICAL INDUSTRIES, LTD.; density=0.925 g/cm$^3$, MFR=2.3 g/10 min. (190° C.)]

PE-12=a mixed resin <density of the mixed resin =0.907 g/cm$^3$> comprising:
- 30% by weight of linear low density polyethylene (ethylene-1-butene copolymer) [made by MITSUI PETROCHEMICAL INDUSTRIES, LTD.; density= 0.920 g/cm$^3$, MFR=2.9 g/10 min. (190° C.)],
- 50% by weight of ethylene-1-butene elastomer [made by MITSUI PETROCHEMICAL INDUSTRIES, LTD.; density=0.885 g/cm$^3$, MFR=0.5 g/10 min. (190° C.)], and 20% by weight of PE-1

PE-13=a mixed resin <density of the mixed resin =0.909 g/cm$^3$> comprising:
- 20% by weight of linear low density polyethylene (ethylene-1-butene copolymer) [made by MITSUI PETROCHEMICAL INDUSTRIES, LTD.; density= 0.920 g/cm$^3$, MFR=2.9 g/10 min. (190° C.)],
- 50% by weight of ethylene-1-butene elastomer [made by MITSUI PETROCHEMICAL INDUSTRIES, LTD.; density=0.885 g/cm$^3$, MFR=0.5 g/10 min. (190° C.)], and 30% by weight of PE-1

PE-14=a mixed resin <density of the mixed resin =0.902 g/cm$^3$> comprising:
- 70% by weight of ethylene-1-butene elastomer [made by MITSUI PETROCHEMICAL INDUSTRIES, LTD.; density=0.885 g/cm$^3$, MFR=0.5 g/10 min. (190° C.)], and
- 30% by weight of PE-1

PE-15=a mixed resin <density of the mixed resin =0.907 g/cm$^3$> comprising:
- 60% by weight of ethylene-1-butene elastomer [made by MITSUI PETROCHEMICAL INDUSTRIES, LTD.; density=0.885 g/cm$^3$, MFR=0.5 g/10 min. (190° C.)], and
- 40% by weight of PE-1

PE-16=a linear low density polyethylene (ethylene-1-butene copolymer) [made by MITSUI PETROCHEMICAL INDUSTRIES, LTD.; density=0.920 g/cm$^3$, MFR=2.9 g/10 min. (190° C.)]

PE-17=a high density polyethylene (homopolymer) [made by MITSUI PETROCHEMICAL INDUSTRIES, LTD.; density=0.965 g/cm$^3$, MFR=15 g/10 min. (190° C.)]

PE-18=an ethylene-1-butene elastomer [made by MITSUI PETROCHEMICAL INDUSTRIES, LTD.; density= 0.885 g/cm$^3$, MFR=0.5 g/10 min. (190° C.)]

Symbols in the tables denotes that ⊚ is excellent, ○ is good, Δ is slightly poor, and x is poor.

TABLE 1

| No. | Outer Layer ←→ Inner Layer Kind of resin [thickness (μ)] | | | | | Total thickness (μ) | Heat resistance | Drop-shock test | Flexibility | Transparency Visual | Transparency Transmission (%) | Appearance | Overall evaluation |
|---|---|---|---|---|---|---|---|---|---|---|---|---|---|
| 1 | PE-1 (15) | PE-2 (80) | PE-3 (10) | PE-2 (80) | PE-3 (15) | 200 | ⊚ | ⊚ | ⊚ | ⊚ | 90.6 | ⊚ | ⊚ |
| 2 | PE-1 (15) | PE-2 (95) | PE-3 (10) | PE-2 (95) | PE-3 (15) | 230 | ⊚ | ⊚ | ⊚ | ⊚ | 89.3 | ⊚ | ⊚ |
| 3 | PE-1 (15) | PE-2 (80) | PE-3 (10) | PE-2 (80) | PE-4 (15) | 200 | ⊚ | ⊚ | ⊚ | ⊚ | 90.3 | ⊚ | ⊚ |
| 4 | PE-1 (15) | PE-5 (80) | PE-3 (10) | PE-5 (80) | PE-3 (15) | 200 | ⊚ | ⊚ | ⊚ | ⊚ | 85.8 | ⊚ | ⊚ |
| 5 | PE-1 (15) | PE-6 (80) | PE-3 (10) | PE-6 (80) | PE-3 (15) | 200 | ⊚ | ⊚ | ⊚ | ⊚ | 86.5 | ⊚ | ⊚ |
| 6 | PE-1 (15) | PE-7 (80) | PE-3 (10) | PE-7 (80) | PE-3 (15) | 200 | ⊚ | ⊚ | ⊚ | ⊚ | 87.0 | ⊚ | ⊚ |
| 7 | PE-1 (15) | PE-8 (80) | PE-3 (10) | PE-8 (80) | PE-3 (15) | 200 | ⊚ | ⊚ | ⊚ | ⊚ | 85.1 | ⊚ | ⊚ |
| 8 | PE-1 (15) | PE-5 (80) | PE-3 (10) | PE-5 (80) | PE-3 (15) | 200 | ⊚ | ⊚ | ⊚ | ⊚ | 85.1 | ⊚ | ⊚ |
| 9 | PE-1 (15) | PE-9 (80) | PE-3 (10) | PE-9 (80) | PE-3 (15) | 200 | ⊚ | ⊚ | ⊚ | ⊚ | 85.7 | ⊚ | ⊚ |
| 10 | PE-1 (15) | PE-8 (80) | PE10 (10) | PE-8 (80) | PE-3 (15) | 200 | ⊚ | ⊚ | ⊚ | ⊚ | 85.1 | ⊚ | ⊚ |
| 11 | PE-1 (15) | PE-8 (80) | PE-3 (10) | PE-8 (80) | PE-11 (15) | 200 | ⊚ | ⊚ | ⊚ | ⊚ | 87.5 | ⊚ | ⊚ |
| 12 | PE-1 (15) | PE-12 (80) | PE-3 (10) | PE-12 (80) | PE-3 (15) | 200 | ⊚ | ⊚ | ⊚ | ⊚ | 84.6 | ⊚ | ⊚ |
| 13 | PE-1 (15) | PE-13 (80) | PE-3 (10) | PE-13 (80) | PE-3 (15) | 200 | ⊚ | ⊚ | ⊚ | ⊚ | 83.9 | ⊚ | ⊚ |
| 14 | PE-1 (15) | PE-14 (80) | PE-3 (10) | PE-14 (80) | PE-3 (15) | 200 | ⊚ | ⊚ | ⊚ | ⊚ | 83.2 | ⊚ | ⊚ |
| 15 | PE-1 (15) | PE-15 (80) | PE-3 (10) | PE-15 (80) | PE-3 (15) | 200 | ⊚ | ⊚ | ⊚ | ○ | 81.3 | ⊚ | ⊚ |

TABLE 2

| No. | Outer Layer ←→ Inner Layer Kind of resin [thickness (μ)] | | | | | Total thickness (μ) | Heat resistance | Drop-shock test | Flexibility | Transparency Visual | Transparency Transmission (%) | Appearance | Overall evaluation |
|---|---|---|---|---|---|---|---|---|---|---|---|---|---|
| I | PE-16 (15) | PE-2 (80) | PE-3 (10) | PE-2 (80) | PE-3 (15) | 200 | Δ | ⊚ | ⊚ | Δ | 86.5 | Δ | Δ |
| II | PE-1 (15) | PE-2 (80) | PE-3 (10) | PE-2 (80) | PE-17 (15) | 200 | ⊚ | X | ○ | ○ | 82.9 | ○ | X |
| III | PE-1 (15) | PE-3 (80) | PE-1 (10) | PE-3 (80) | PE-1 (15) | 200 | ⊚ | Δ | ○ | ○ | 81.5 | ○ | Δ |
| IV | PE-1 (15) | PE-2 (80) | PE-3 (10) | PE-2 (80) | PE-18 (15) | 200 | X | Δ | ⊚ | ○ | 81.0 | ○ | X |

It is clear from Table 1 and Table 2 that the films and containers of the invention are excellent in flexibility, heat resistance, strength, and transparency.

Industrial Applicability

The multilayer film and container according to the invention possess many advantages, for example:

Capable of withstanding high pressure steam sterilization, hot water sterilization, or other high temperature sterilization.

Capable of reducing the overall thickness of a film.

Excellent in tensile strength and capable of producing a bag at high speed.

Hardly inducing blocking.

Capable of conducting heat sealing at high temperature and in short time, and excellent in sealing performance.

Capable of maintaining excellent flexibility and transparency even after sterilization.

Hence, it can be preferably used as container for medical use such as a transfusion bag, a blood bag or the like.

What is claimed is:

1. A multilayer film, comprising a five-layer resin film comprising an ethylene-α-olefin copolymer in each layer, wherein the density of the resin comprising each layer is as follows, in order from the outer layer:

First layer: 0.935 to 0.950 g/cm$^3$
Second layer: 0.920 g/cm$^3$ or less
Third layer: 0.925 to 0.950 g/cm$^3$
Fourth layer: 0.920 g/cm$^3$ or less
Fifth layer: 0.925 to 0.940 g/cm$^3$.

2. A multilayer film according to claim 1, wherein in the resin of the fifth layer, an ethylene-α-olefin copolymer with a density of 0.945 g/cm or more is present in an amount of 10% by weight or less.

3. A multilayer film according to claim 1, wherein the resin in the second and fourth layers is a mixed resin comprising 40 to 60% by weight of ethylene-α-olefin copolymer with density of 0.900 to 0.920 g/cm³, 40 to 60% by weight of ethylene-α-olefin elastomer with density of less than 0.900 g/cm³, and less than 5% by weight of high density polyethylene with density of 0.955 g/cm³ or more.

4. A multilayer film according to claim 1, wherein the resin in the second and fourth layers is a mixed resin comprising 20 to 60% by weight of ethylene-α-olefin copolymer with density of 0.900 to 0.920 g/cm³, 40 to 60% by weight of ethylene-α-olefin elastomer with density of less than 0.900 g/cm³, and 30% by weight or less of ethylene-α-olefin copolymer with density of 0.935 to 0.945 g/cm³.

5. A multilayer film according to claim 1, wherein the resin used in the second and fourth layers is a mixed resin comprising 20 to 50% by weight of ethylene-α-olefin copolymer with density of 0.935 to 0.945 g/cm³, and 50 to 80% by weight of ethylene-α-olefin elastomer with density of less than 0.900 g/cm³.

6. A multilayer film according to any one of claims 1 to 5, wherein the thickness of each layer based on the entire thickness of the film lies in the following range:

| | |
|---|---|
| First layer | 5 to 15% |
| Second layer | 35 to 45% |
| Third layer | 3 to 10% |
| Fourth layer | 35 to 45% |
| Fifth layer | 5 to 15% |

7. A container formed by using a multilayer film according to any one of claims 1 to 5.

8. A container formed by using a multilayer film according to claim 6.

* * * * *

UNITED STATES PATENT AND TRADEMARK OFFICE
CERTIFICATE OF CORRECTION

PATENT NO. : 5,792,526
DATED : August 11, 1998
INVENTOR(S) : Watanabe

It is certified that error appears in the above-identified patent and that said Letters Patent is hereby corrected as shown below:

Column 9, line 1, delete "g/cm" and insert --g/cm3--.

Signed and Sealed this

Twenty-third Day of February, 1999

Attest:

Q. TODD DICKINSON

*Attesting Officer*       *Acting Commissioner of Patents and Trademarks*

UNITED STATES PATENT AND TRADEMARK OFFICE
CERTIFICATE OF CORRECTION

PATENT NO. : 5,792,526
DATED : August 11, 1998
INVENTOR(S) : Katsushi Watanabe, et. al.

It is certified that error appears in the above-identified patent and that said Letters Patent is hereby corrected as shown below:

Column 9, line 1, delete "g/cm3" and insert --$g/cm^3$--.

This certifcate supersedes Certificate of Correction issued February 23, 1999.

Signed and Sealed this

Twenty-fourth Day of August, 1999

Attest:

Q. TODD DICKINSON

Attesting Officer

Acting Commissioner of Patents and Trademarks